United States Patent Office 3,433,125
Patented Mar. 18, 1969

3,433,125
MULTIPLE CHANNEL SERVO SYSTEMS
Douglas B. Gemmell, London, England, assignor to Elliott Brothers (London) Limited, London, England, a British company
Filed Mar. 13, 1967, Ser. No. 622,559
Claims priority, application Great Britain, Mar. 15, 1966, 11,372/66
U.S. Cl. 91—363                                         6 Claims
Int. Cl. F15b *9/02;* H02p *1/04;* B64c *13/38*

ABSTRACT OF THE DISCLOSURE

A composite control signal for each separate channel of a multiple channel servo system having a common output is obtained from the input signal for each channel, the actuator feedback signal for each channel, and a lagged feedback signal derived from the common output for the system. In this way, the separate channels are prevented from drifting apart.

---

This invention concerns improvements relating to multiple channel servo systems, and more particularly to systems having integral control, and its principal object is to eliminate a source of instability and inaccuracy in such systems.

In modern control systems it is frequently desirable to use multiplexed servo control channels to ensure that if one channel, or a component in one channel, should fail the control is not made inoperative, since the other channels take over the whole of the duties of control. In such systems it is necessary to provide separate control signal inputs to each of the channels and to consolidate the multiple outputs at a common output member. This raises serious design problems where there are (as is inevitable in practical systems) slight disparities in characteristics between the different channels. Provided that the servo loops are controlled by non-time-dependent signals it is possible to keep the disparities within constant and acceptable limits by the use of conventional design techniques. Where, however, the servo loops include time integrals or time-decaying feedback, conventional design techniques are inadequate.

In order that the further description may clearly be understood, it will be continued with reference to the accompanying drawings in which.

Figure 1:
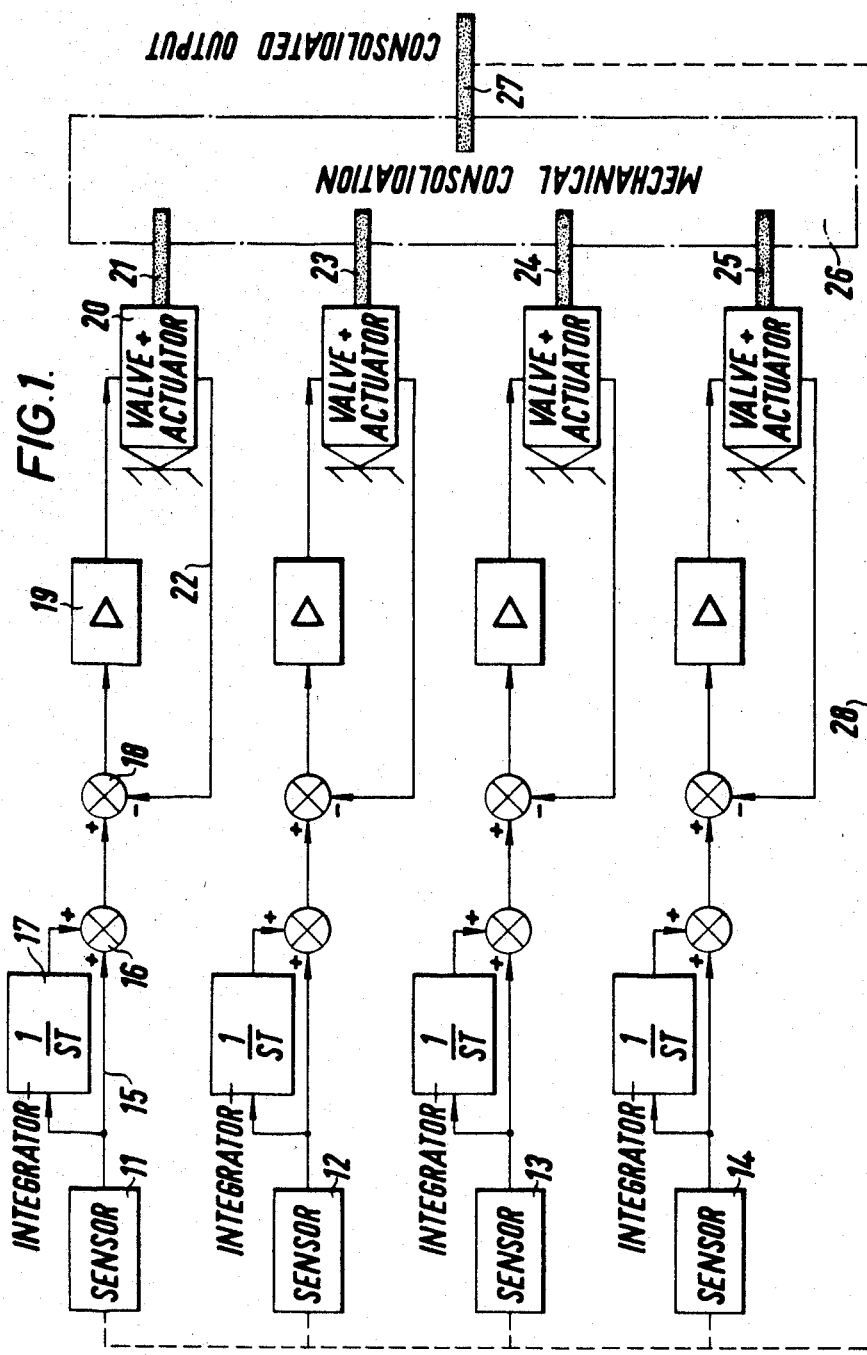
FIGURE 1 illustrates a multiplex servo system with proportional plus integral command computing using conventional servo techniques.

Referring first to the system employing conventional design techniques illustrated diagrammatically in FIGURE 1, there are shown four sensors, respectively 11, 12, 13, and 14 which may, for example, be rate gyroscope, that is to say, gyroscopes having one degree of freedom. The sensors are respectively associated with four separate servo channels. The output signal from the sensor 11, associated with the first channel, is fed via a line 15 to a unit 16. The unit 16 may be an amplifier having two inputs, the output being related to the sum of or the difference between the inputs. For convenience, units which have a plurality of inputs and produce an output dependent upon both will be referred to herein as "mixers." The output of the sensor 11 is also fed to an integrator 17 which integrates the sensor signal and an integrator 17 which integrates the sensor signal and produce an integral signal $1/ST$ which is a function of the sensor signal and time. The output of the unit 17 is also fed to the mixer 16 and the output of the latter is fed to a further mixer 18. The output from the mixer 18 is fed to an amplifier 19 which is of conventional type and the output of the latter unit is applied to a valve-plus-actuator unit 20.

The valve-plus-actuator unit 20 may be of conventional type, comprising a double-acting hydraulic actuator having a control valve which, in a central position, cuts off the supply of hydraulic fluid to both sides of the piston so that the piston is held in its set position. If the valve is moved in one direction from the central position, it admits pressure fluid to the cylinder on one side of the piston and simultaneously connects the cylinder on the other side of the piston to an exhaust channel so that the piston is constrained to move in one direction, whereas if the valve is moved in the other direction the reverse fluid connections are made and the piston is constrained to move in the other direction. In either case the valve must be moved back to its central position in order to stop the movement of the piston. Movement of the piston moves an output member 21, which may be the piston rod.

A signal dependent upon the piston position is fed back from a conventional feedback device (not shown) associated with the output member 21 via a line 22 to the mixer 18. The feedback signal opposes the signal from the sensor and the integrator at the mixer 18 and when the piston has moved the required distance commanded by the combined signal from the sensor 11 and intergator 17 the feedback signal from the actuator balances out the control signal, so that the valve in the unit 20 is returned to its neutral position and the piston stops.

The second, third and fourth servo channels associated respectively with the sensors 12, 13 and 14 are identical with the channel associated with the sensor 11, the mechanical output of the second channel appearing at the output member 23, the mechanical output of the third channel appearing at the output member 24 and the output of the fourth channel appearing at the output member 25.

The outputs of the four output members, 21 23, 24 and 25 are consolidated, that is to say, they are combined in a unit, generally indicated by reference 26 and labelled "mechanical consolidation." The mechanical consolidation may, and usually does, consist in a mechanical linkage coupling the four output members 21, 23, 24 and 25 in such a manner that the consolidated output appearing at a consolidated output member 27 represents the average of the positions of the four piston rods 21, 23, 24 and 25.

If the system of FIGURE 1 is used in an aircraft there is a further feedback, indicated by the dotted line 28, from the consolidated output member 27 to the sensors. In the case of an aircraft this is generally the aerodynamic loop of the aircraft. A little consideration will show that when the sensors detect a change in the particular parameter which they are desired to control, they activate the respective servo channels, which all act to move the consolidated output member 27 in such a sense as to cancel out the change sensed by the sensors. This cancellation takes place through the notional feedback line 28.

Assuming that the control signal applied by the sensor 11 in a particular circumstance has a value 1, the signal applied to the mixer 18 is $1+1/ST$ which is equal to $1+ST/ST$.

In a practical system there are inevitably small differences in the characteristics of the four servo channels, for example, in that the sensors provide very slightly different signals for a given change or in that, to take another example, one of the sensors provides a small residual signal at its nominal zero-signal position. Due to the presence of the integrator in the associated channel, which is assumed to be the first channel associated with the sensor 13, the residual signal will build up with time to the point at which the channel is activated and moves its output member 21 to try to correct the residual signal. This, however, affects the consolidated output member 27 and the change produced by its movement is effectively fed back over the line 28 to the sensors 12, 13 and 14 which produce opposing signals, and activate their own channels. The consequence is that all the channels begin to drift apart. If the system consisted only of two channels then they would drift equally in opposite directions, the algebraic sum of their drifts being zero.

Figure 2:
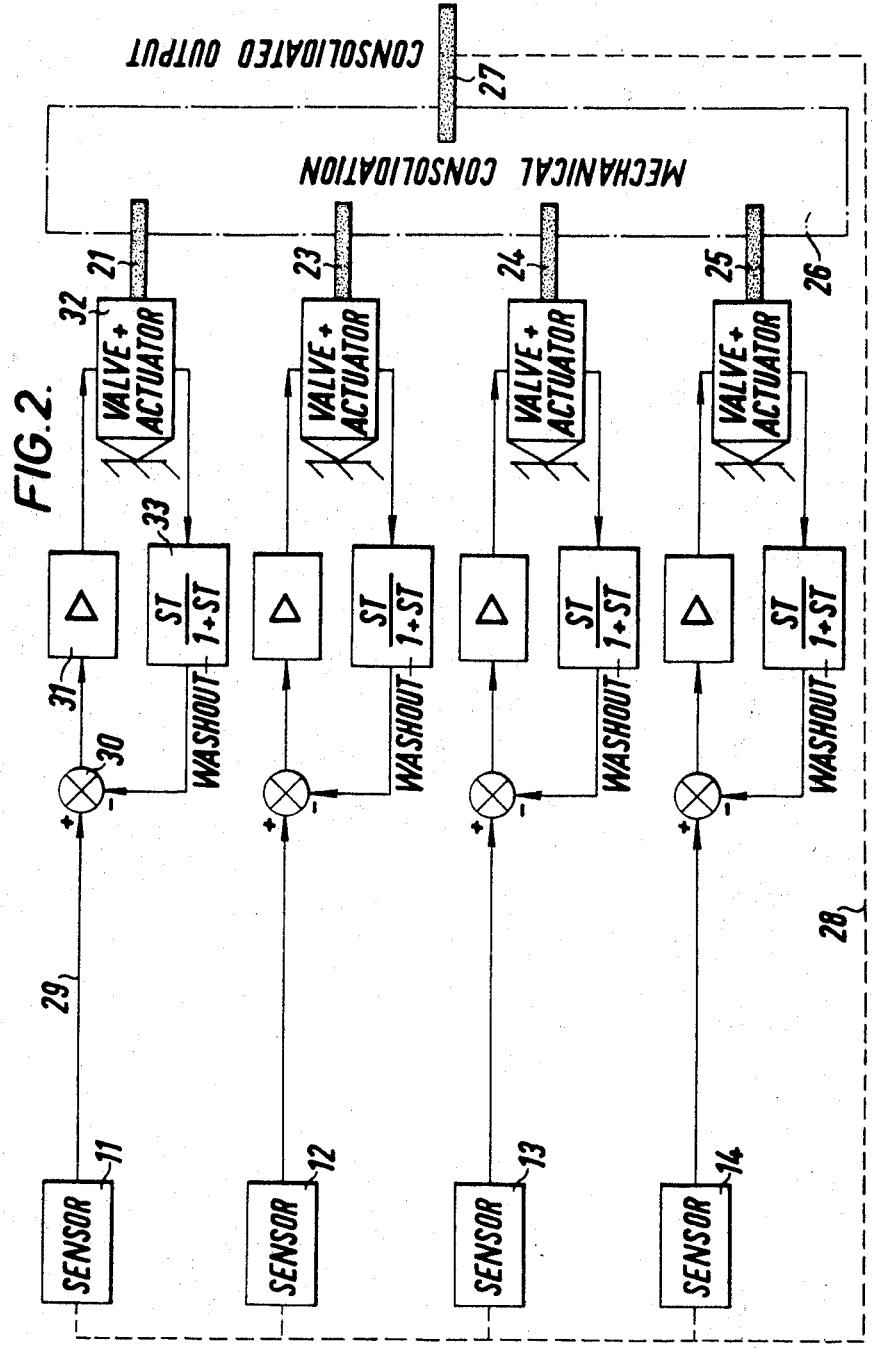
FIGURE 2 illustrates a similar system using feedback wash-out as alternative means for obtaining proportional plus integral control.

FIGURE 2 illustrates an alternative system, also employing conventional techniques, the four sensors 11, 12, 13 and 14 being again provided, the four channels having output members, respectively 21, 23, 24 and 25, the movements being consolidated in the mechanical consolidation unit 26 which provides the combined output at the consolidated output member 27, all as in the case of FIGURE 1. The servo channels are, however, different. The sensor 11 associated with the first channel provides a signal via an input path 29 to a mixer 30 from which a signal is applied to an amplifier 31 feeding the valve-plus-actuator unit 32. In this case, however, the feedback signal from the output member 21 is not a mere position signal, but includes a washout filter. The position signal from the output rod 21 is fed to a washout filter 33 which produces an output signal $ST/1+ST$. This combined signal is fed to the mixer 30 and acts as a signal opposing the signal from the sensor 11 in the ordinary way. The sensors 12, 13 and 14 of FIGURE 2 are associated respectively with the second, third and fourth servo channels, which are identical with the first channel associated with the sensor 11.

In this case, also very minor differences in the characteristics of the four servo channels will cause drift, due to the washout unit 33 and the equivalent units in the other channels, as described in connection with the embodiment of FIGURE 1.

The principal object of the invention is to provide a multiple channel servo channel system in which drift of the separate channels is prevented even when a time-integral term is required.

The present invention is based on the idea of deriving the integral term of the control signal of each servo channel from the feedback signal produced by the consolidated output member. Accordingly, the present invention provides a multiple channel servo system comprising a plurality of separate servo control channels, each channel having an input path to receive an input signal and an actuator having an output member to produce a mechanical movement in response to a control signal, produced in the channel each channel also having means to feed back a channel feedback signal from the output member to the input path to cancel out the control signal when the required mechanical movement has been produced, the system including a consolidating device coupled to the output members of all the channels and having a consolidated output member to produce a consolidated output movement dependent upon the combined movements of all the channel output members, and means to lag with respect to time a feedback signal (hereinafter called the consolidated feedback signal) representing the movement of the consolidated output member and to feed said signal by a separate path to each servo control channel so that the lagged consolidated feedback signal is combined in each channel with the input signal to produce said control signal.

Since in the present invention there is no integrator in any servo channel itself, there is no buildup of a signal as above described and, therefore, no drift of the servo channels. Preferably the input path of each channel contains an amplifier or the like for combining the input signal and the feedback signal from the output member. The input path may also contain a further amplifier or the like to which the input signal and the consolidate feedback signal are applied, the further amplifier being connected between the beginning of the input path and the first-named amplifier.

There may also be a further amplifier between the input path and the actuator to amplify the combined signal which is applied to the actuator.

There may be a sensor associated with each input path, such as a rate gyroscope.

Figure 3:
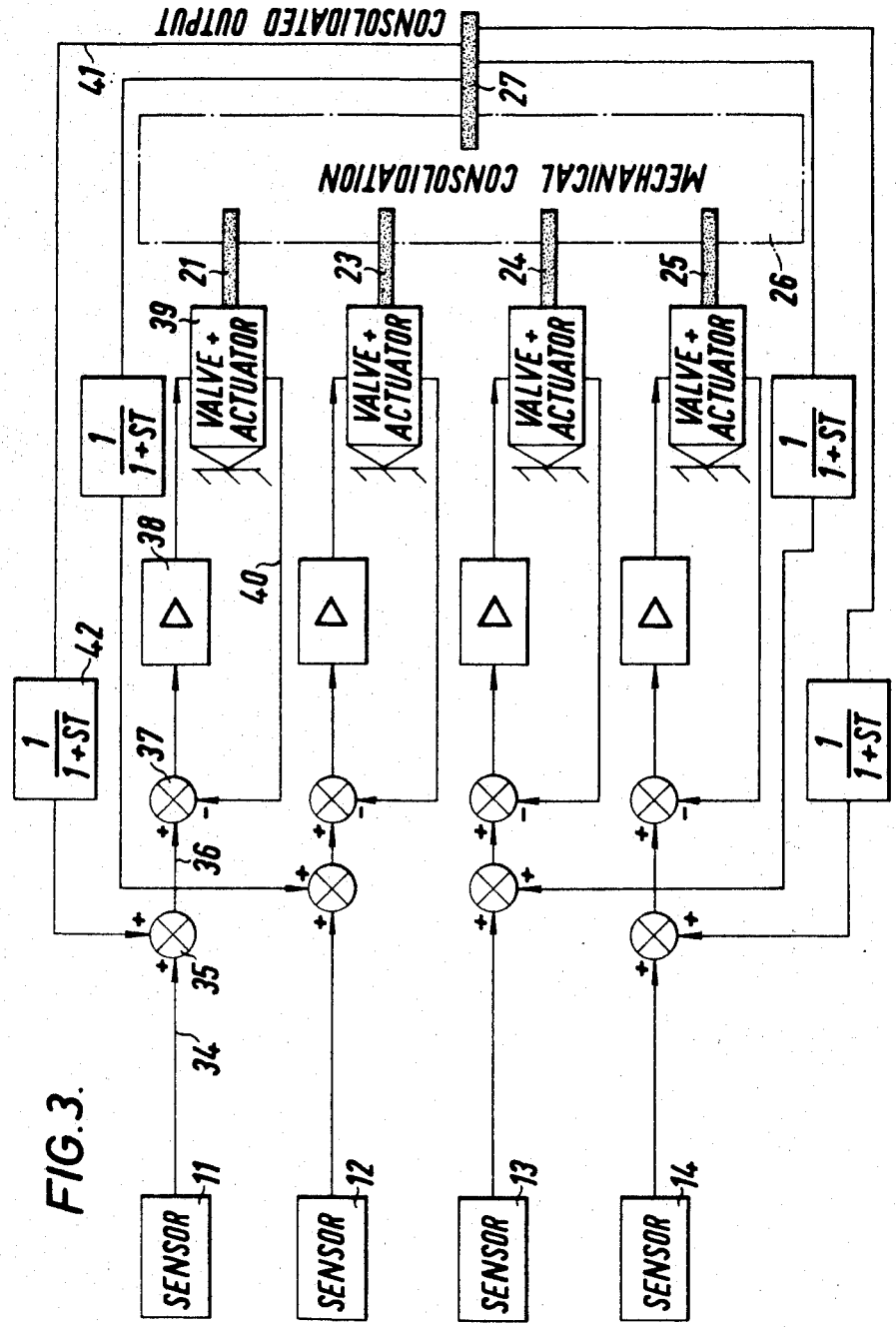
FIGURE 3 illustrates a system to provide consolidated integral plus proportional control in accordance with the invention.

A multiple channel servo system according to the invention will now be described with reference to FIGURE 3, which shows the four sensors 11, 12, 13 and 14 corresponding with the sensors shown in FIGURES 1 and 2. The sensor 11 of FIGURE 3 is associated with a first servo control channel having an input path 34 by which the control signal from the sensor 11 is transmitted to a mixer 35. The output of the mixer 35 is applied to a further portion 36 of the input path and thence to a further mixer 37. It should be noted at this stage that the mixers 35 and 37 could comprise a single unit to which three input signals may be applied.

From the mixer 37 the output signal is applied to an amplifier 38, which may be of conventional type, as before, and this feeds a valve-plus-actuator unit 39 which is the same as those described and shown in the embodiments of FIGURES 1 and 2 and has an output member 21. A position feedback signal is taken from means (not shown) associated with the output member 21 directly to the mixer 37 by a line 40 and this opposes and cancels out the signal applied over the line 36 when the output member 21 has executed the movement commanded by the control signal.

The second, third and fourth servo channels, associated with the sensors 12, 13 and 14 respectively, are precisely the same as the first servo channel and have respective output members 23, 24 and 25 whose outputs are consolidated in the mechanical consolidation unit 26 to produce a consolidated output at the consolidated output member 27, as in the previously described systems.

The essential difference in the system of FIGURE 3 is that feedback means (not shown) are associated with the consolidated output member 27 by which a separate consolidiated feedback signal may be transmitted to the input path of each servo channel and the consolidated feedback signal contains a term which is a function both of the position of the consolidated output member 27 and of time. Assuming that the input signal has a value 1 the feedback signal from the output member 21 to the mixer 37 also has a value 1, while the feedback signal from the consolidated output member 27 is applied by means of the line 41 to a unit 42 which, from the position signal, generates the signal $1/1+ST$ multipled by the feedback signal from the consolidated output and the output from the unit 42 is fed to the second input of the mixer 35.

In this manner the further advantage is produced that all the servo channels receive substantially the same feedback signal i.e. since the feedback is not through a sensor and, although there may be variations in the individual positions of the output members 21, 23, 24 and 25 associated with the different channels, owing to slight differences in the characteristics of the different channels, the consolidated output member 27 can only have one position. Thus disparities between the sub-channel inputs only affect the respective sub-channel outputs in direct proportion to the disparity, and not as a velocity drift.

Clearly the system according to the invention may be built up according to current techniques for servo design.

I claim:
1. A multiple channel servo system comprising a plurality of separate servo control channels, each channel having an input path to receive an input signal and an actuator having an output member to produce an output in response to a control signal produced in the channel, each channel also having means to feed back a channel feedback signal from the output member to the input path to cancel out the control signal when the required channel output has been produced, the system including a device coupled to the output members of all the channels and having an output member to produce a system output dependent upon the combined outputs of all the channel output members, means for producing a system feedback signal representing said system output, means for lagging said system feedback signal with respect to time, and means for feeding the lagged system feedback signal by a separate path to each servo control channel so that the lagged system feedback signal is combined in each channel with the input signal thereof to produce said control signal, the effect of including the lagged system feedback signal being to provide a proportional plus time integral characteristic to the multiple channel servo system, in such manner as to prevent the separate channels from drifting apart.

2. A servo system according to claim 1, wherein the combination of the lagged system feedback signal with each channel input signal and the combination of the control signal with the channel feedback signal are effected by means of a mixer.

3. A servo system according to claim 2, wherein the two combinations are effected in separate mixers.

4. A servo system according to claim 1, wherein the input signal to each channel is derived from a sensor capable of producing a signal representative of an aircraft flight parameter.

5. A servo system according to claim 4, wherein said sensor is a rate gyroscope.

6. In a multiple channel servo system of the type having a plurality of separate servo channels, each having means for producing an input signal and an actuator having an output responsive to a composite control signal including said input signal, means for producing a channel output feedback signal which forms a part of said composite control signal to terminate operation of the actuator when the required actuator output has been produced, and means for receiving the outputs of said actuators for producing a common output, the improvement comprising:
a feedback means for producing a lagged feedback signal from said common output, and
means for applying said lagged feedback signal to form a part of said composite control signal of each of the separate servo control channels whereby the separate channels are prevented from drifting apart.

References Cited

UNITED STATES PATENTS 3,124,041    3/1964    McMurtry et al.

FOREIGN PATENTS 630,968    11/1961    Canada.

PAUL E. MASLOUSKY, *Primary Examiner.*

U.S. Cl. X.R.

244—78; 91—411; 318—489